US012613688B1

(12) United States Patent
Duraibabu et al.

(10) Patent No.: US 12,613,688 B1
(45) Date of Patent: Apr. 28, 2026

(54) LATENCY DETECTION IN A DEPLOYMENT BUILD PIPELINE

(71) Applicant: Amazon Technologies, Inc., Seattle, WA (US)

(72) Inventors: Venkatesh Duraibabu, Vadakuthu (IN); Mogith Dasappagoundanpudur Natarajan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 17/696,764

(22) Filed: Mar. 16, 2022

(51) Int. Cl.
*G06F 9/44* (2018.01)
*G06F 8/65* (2018.01)
(52) U.S. Cl.
CPC ...................................... *G06F 8/65* (2013.01)
(58) Field of Classification Search
CPC ....................................................... G06F 8/65
See application file for complete search history.

(56) References Cited

U.S. PATENT DOCUMENTS

| | | | | |
|---|---|---|---|---|
| 7,685,270 | B1 * | 3/2010 | Vermeulen | .......... H04L 41/5083 |
| | | | | 710/36 |
| 10,613,970 | B1 * | 4/2020 | Jammula | ............. G06F 11/3688 |
| 2015/0326455 | A1 * | 11/2015 | Hui | ....................... H04L 43/045 |
| | | | | 715/736 |

| | | | | |
|---|---|---|---|---|
| 2017/0153038 | A1 * | 6/2017 | Wootton | .................. F24F 11/48 |
| 2017/0180487 | A1 * | 6/2017 | Frank | .................. G06F 11/3688 |
| 2018/0275970 | A1 * | 9/2018 | Woulfe | ..................... G06F 8/70 |
| 2019/0361688 | A1 * | 11/2019 | Chigakkagari | ....... G06F 11/302 |
| 2023/0246927 | A1 * | 8/2023 | Siakou | .................. H04L 41/046 |
| | | | | 709/223 |

OTHER PUBLICATIONS

Simon Thulbourn, "New-Analyze and debug distributed applications interactively using AWS X-Ray Analytics", dated Jan. 23, 2022, pp. 1-6.

(Continued)

*Primary Examiner* — Hang Pan
(74) *Attorney, Agent, or Firm* — Robert C. Kowert; Kowert, Hood, Munyon, Rankin & Goetzel, P.C.

(57) ABSTRACT

An automatic code deployment pipeline with multiple stages for automated build, test and deployment of code updates to a production execution environment includes functionality for detecting end-user latency introduced by the code changes prior to full production deployment of the updates. In response to a request to deploy an updated application (or component thereof) to a full production environment, the pipeline executes the updated application in a less-than-full-production execution environment, and obtains end-user latency metrics during the execution of the updated application. The pipeline determines, based on analysis of the obtained end-user latency metrics for the updated application relative to latency metrics for the non-updated application running in the production execution environment, whether the update causes a latency regression for the application. For a significant latency regression, automated deployment is halted. For the case of no or insignificant latency regression, the pipeline continues the automated deployment.

20 Claims, 8 Drawing Sheets

(56) References Cited

OTHER PUBLICATIONS

Farhan Khan, "The Cost of Latency", Retrieved from from https://www.digitalrealty.com/resources/articles/the-cost-of-latency, dated Mar. 10, 2015, pp. 1-5.

Steve Olenski, "Why Brands are Fighting OVer Milliseconds", Retrieved from https://www.forbes.com/sites/steveolenski/2016/11/10/why-brands-are-fighting-over-milliseconds/#:~:text=Good%20service%20used%20to%20mean,the%20customer's%20business%20a%20priority, dated Nov. 10, 2016, pp. 1-5.

Yoav Einav, "Amazon Found Every 100ms of Latency Cost them 1% in Sales", Retrieved from https://www.gigaspaces.com/blog/amazon-found-every-100ms-of-latency-cost-them-1-in-sales, dated Jan. 20, 2019, , pp. 1-8.

AWS, "AWS CodeDeploy", dated Jan. 21, 2022, (https://aws.amazon.com/codedeploy), pp. 1-7.

Robin Whitmore, "Investigate a latency Regresssion", dated Jan. 24, 2022, (https://lightstep.com/doc/investigate-latency-regression), pp. 1-15.

* cited by examiner

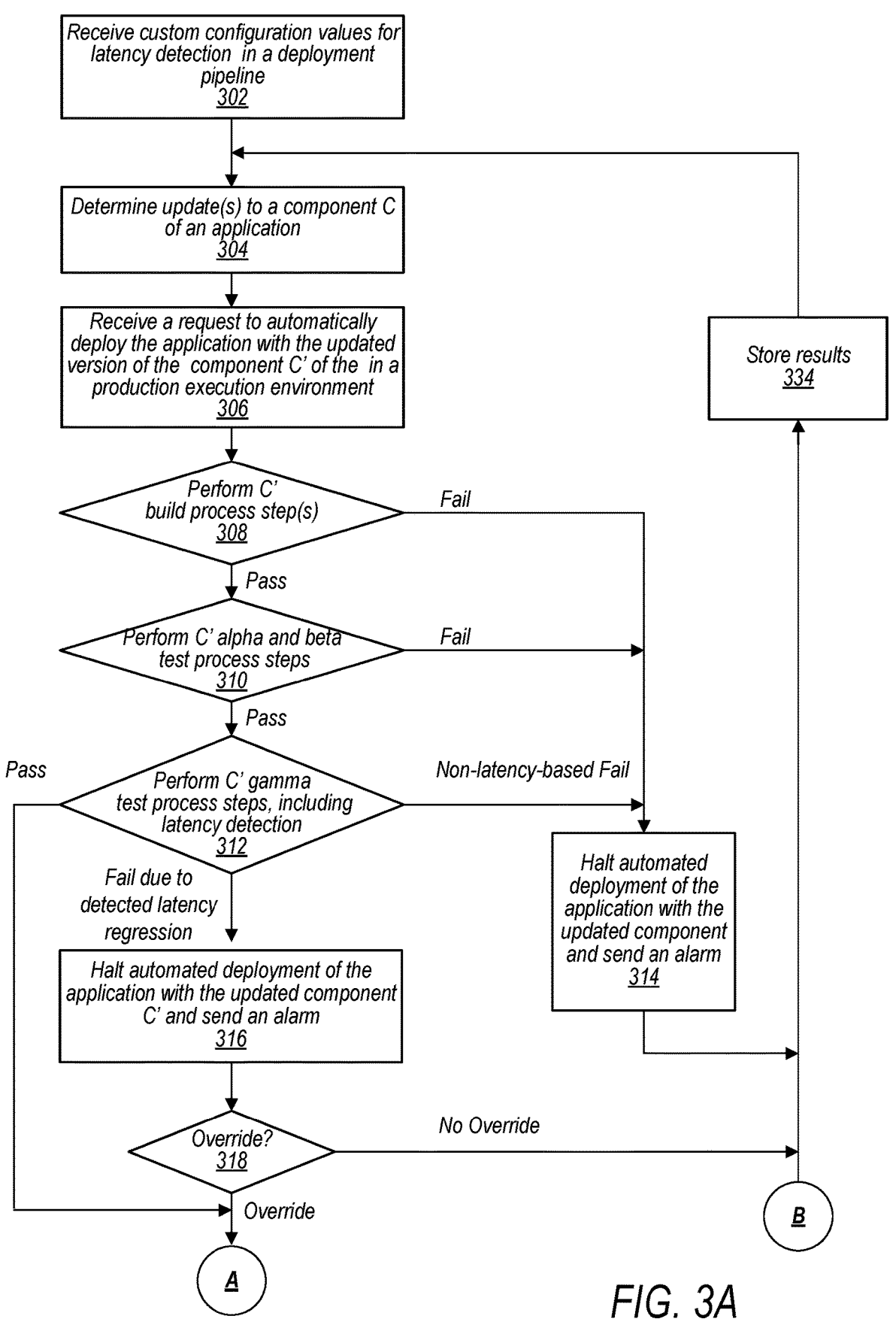

Receive custom configuration values for latency detection in a deployment pipeline
302

Determine update(s) to a component C of an application
304

Receive a request to automatically deploy the application with the updated version of the component C' of the in a production execution environment
306

Perform C' build process step(s)
308

*Pass*

*Fail*

Perform C' alpha and beta test process steps
310

*Pass*

*Fail*

Perform C' gamma test process steps, including latency detection
312

*Pass*

*Non-latency-based Fail*

*Fail due to detected latency regression*

Halt automated deployment of the application with the updated component and send an alarm
314

Halt automated deployment of the application with the updated component C' and send an alarm
316

Store results
334

Override?
318

*No Override*

*Override*

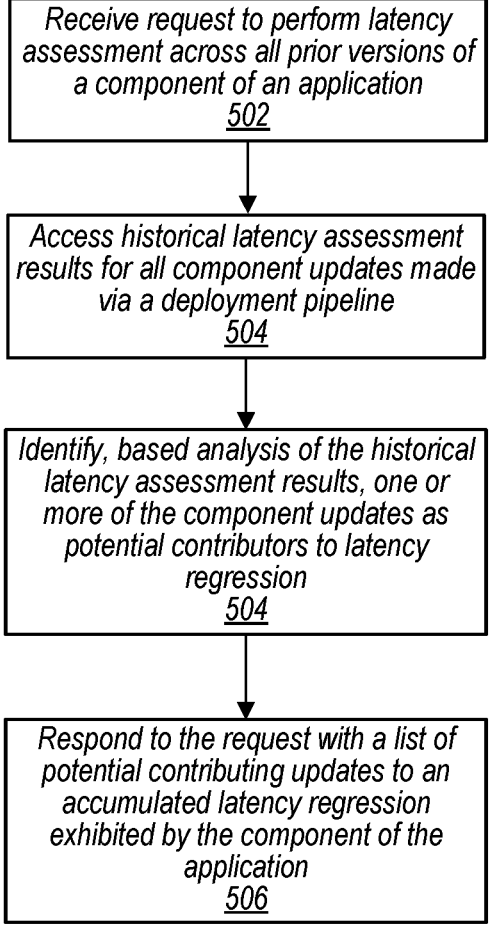

Receive request to perform latency
assessment across all prior versions of
a component of an application
502

Access historical latency assessment
results for all component updates made
via a deployment pipeline
504

Identify, based analysis of the historical
latency assessment results, one or
more of the component updates as
potential contributors to latency
regression
504

Respond to the request with a list of
potential contributing updates to an
accumulated latency regression
exhibited by the component of the
application
506

FIG. 5

LATENCY DETECTION IN A DEPLOYMENT BUILD PIPELINE

BACKGROUND

In some systems, latency may not be discovered until after an update to an application is fully deployed to a production environment. The amount of time between updates to an application during development and test and discovery of latency later after the update has been deployed to a production environment, as well as the fact that many updates may be deployed at once, in combination with the complexity of application architectures that rely upon various sub-application or services for functionality, can make it difficult to determine what part of an update, or which individual update of a set of updates over time is most attributable to latency experienced by an end-user of the application executing in the production environment.

BRIEF DESCRIPTION OF THE DRAWINGS

FIGS. 3A and 3B illustrate a process diagram of latency detection functionality performed by one or more components of a deployment build pipeline, according to some embodiments.

FIG. 5 illustrates a process diagram of production latency detection functionality performed by one or more components of a deployment build pipeline, according to some embodiments.

Figure 1:
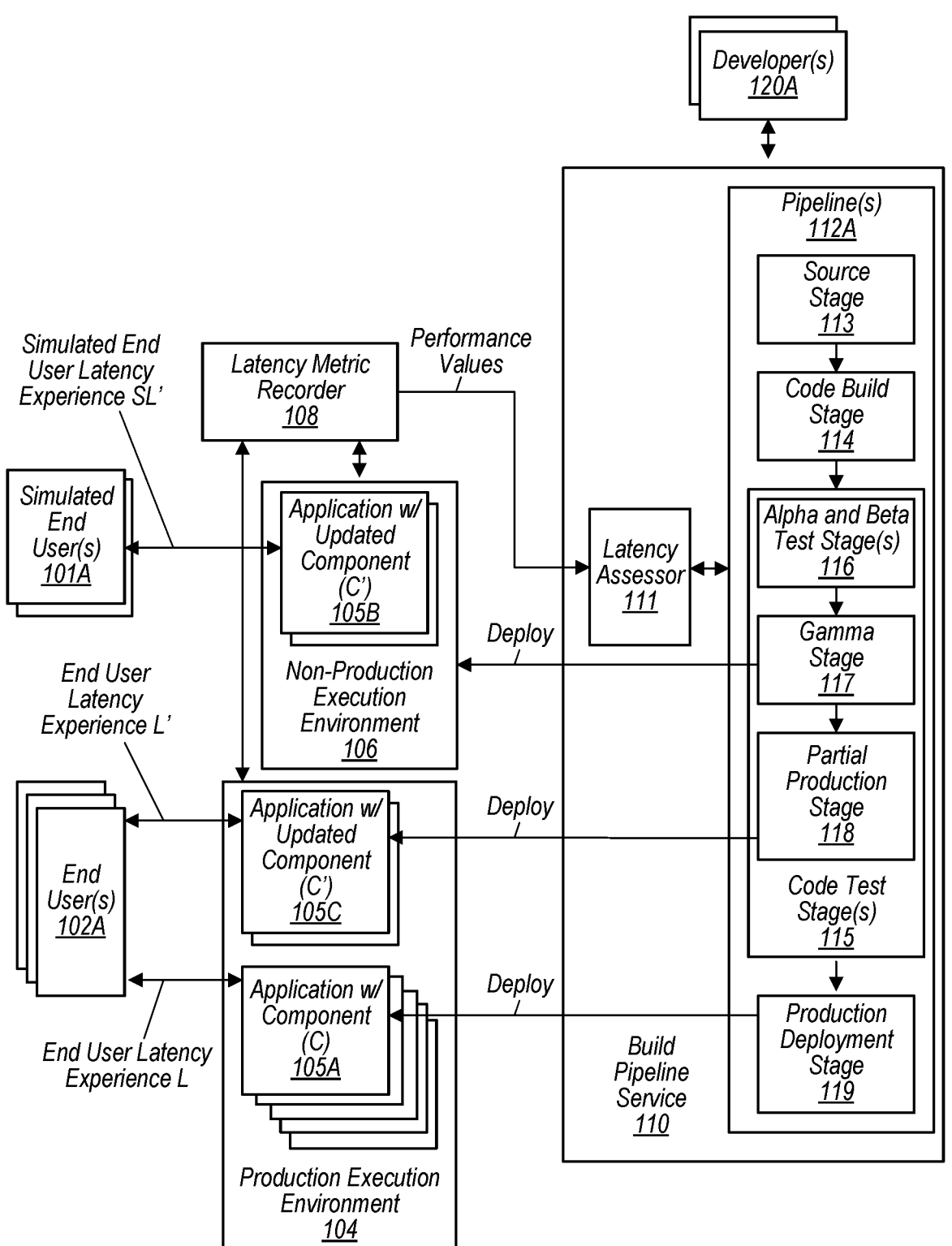
FIG. 1 illustrates a system architecture in which latency detection is implemented within a deployment build pipeline, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed in more detail below, systems and methods for latency detection in a deployment build pipeline are disclosed. An automated deployment build pipeline receives an indication of an update to a component of an application that is to be automatically deployed, via the pipeline, to a production execution environment. The system obtains latency data for end-user latency metrics for both the application running in a less-then-full-production execution environment as well as for the version of the application with the updated component running in a less-then-full-production execution environment, and analyzes the latency data and determines whether the updated component for the application causes a latency regression for the application. For the case of latency regression, the deployment build pipeline may halt the automated deployment, sending an alarm and/or prompting for whether to override the halted deployment. For the case of no latency regression the deployment build pipeline continues with the automated deployment of the updated component to a full-production environment.

For some systems, service owners may be unaware of the impact made by code changes and/or launches on other systems and/or services such as but not limited to direct sub-components of an application. For example, a streaming radio service on a service provider network may be unaware of an impact on another feature of the streaming radio service when a change is being deployed through a pipeline or due to a launch.

Embodiments of the instant disclosure provide a solution that measures the latency impact of changes before deploying the changes to a production environment. Sometimes, such changes are tested in the pre-production stage with test data or manually tested with limited inputs. These types of testing do not represent the "true" impact as they are in an artificial system. Other types of testing may be performed after deployment to production and may be considered a reactive type of analysis-performed after deployment to production. Embodiments of the instant latency detector automate latency detection in a continuous deployment pipeline, analyzing the latency differences between an application with a non-changed component C and the application with an updated component C', for example. When latency regression is detected, the system may be configured to respond by performing any of various functionality from sending an alarm to rolling back versions of code, etc. For example, the latency detector may instruct the pipeline to rollback an application with an updated component (C') to the version of the application prior to the update to the component (C) and may send an alarm to a development team to suggest addressing the latency issue. In embodiments, such features of a latency detector are a proactive solution that eliminates at least some post production issues and may exhibit the added benefit of preventing, at an earlier point in time, negative customer impact.

Additionally, some systems (e.g., development environments) are unable to measure end-user latency at all to say nothing of measuring end-user latency at scale in a distributed, cloud-based system with numerous end users and mountains of metric data to process. For example, some systems may measure latency regression with regard to a subcomponent of a larger service, but have no way to determine latency regression experienced by an end-user of the larger service with regard to an update made to a subcomponent of the larger service.

For some embodiments described herein, it may be beneficial to reduce or minimize latency experienced by end users such that the end-user experience is more life-like (e.g., produces an experience that mimics human interaction, in one non-limiting example) in some embodiments.

For example, customers experiencing greater end-user latency while interacting with systems or services that mimic or otherwise are similar to human interaction (e.g., entertainment services, smart home systems, household organization services, communication system/services, shopping services, news services, etc.) may interact less with the system or service in the future after experiencing the greater latency when compared to customers experiencing less end-user latency while interacting with the systems/services. In another example, customers that interact with systems that have exhibited an expected amount of latency may interact less with the service when the latency worsens beyond the expected amount. Similar reductions in interactions may also hold for systems/services that call upon such systems/services the exhibit end-user latency (e.g., because other systems/services without the latency are available, or because the calling systems/services cannot operate based on late responses or for similar reasons).

In another example, the less interactive a site becomes the more likely users are to simply click away to a competitor's site. Speed is becoming even more imperative. To provide a few non-limiting examples, it has been found that for some systems, latency on the order of 100 milliseconds (ms) can cost an enterprise 1% of sales, in some instances. A half-second in additional search page generation time can drop search traffic by as much as 20 percent, and an additional 5 ms of latency for an electronic trading platform can cause as much as a $4 million loss in revenue. Some research suggests that 25 percent of people will abandon a website that takes longer than 4 seconds to load, and that just one instance of buffering decreases video consumption by as much as 39%.

To explore one of the above technical areas in more detail in an example, video lag, or buffering, can be caused by a few different variables. Some rural residential Internet provider networks can be too slow to handle HD video; but that may not be a problem in providers in more urban areas. Another potential source of latency is the media company distributing the video. Video delivery relies on having a close and open route from its server to the destination. As such, video is likely being hosted on servers (edge servers or similar of a content delivery network (CDN)) much nearer to the destination. Media companies rely on such content delivery networks to reduce latency. They may host their content on servers all over the country, even around the world, because generally, the further a file has to travel, the slower the playback will be for the video consumer." But being close to the end destination does not guarantee that a video file will arrive uninterrupted. The route that a file takes can become clogged with other files, a particularly serious problem when many computers are trying to access the same file from the same source.

At least some embodiments described herein provide for a system that determines an impact of code changes deployed through a pipeline on end-user-perceived latency, such as end-users of one or more of the above-noted services or similar. Some embodiments described herein provide for a system that determines an impact of a partial-production system launch on end-user-perceived latency. Various types of latency are used as examples herein.

End-user-experienced latency may be measured in various different ways. For example, for systems or services operating in an environment with a metrics service that records performance metrics for the system, the metrics service may record a time of a request (a timestamp for a simulated or production request, etc.). For a request that requires processing by various sub-systems, each of the sub-processes may be tracked with initiation and completion time stamps for each sub-process. A timestamp for when the response is ready to send in response to the request may be obtained. For some systems, the time between initiation of the request by a user and the time when the response is ready to send may act as an approximation for the end-user experienced latency. For example, for some system updates (e.g., code changes performed and tested via the pipeline) any increase in latency experienced by an end-user due to a code change (e.g., latency introduced by a sub-system taking longer to perform a particular function) would also be expressed the time between initiation of the request by a user and the time when the response is ready to send, even though transmission time to an end-user goes unaccounted for in some such techniques.

In systems where a client on a client device may generate or update a timestamp a metrics service may obtain such timestamps to calculate a more accurate overall latency experience by and end-user, measuring the time difference between initiation of the request at the client and the receipt of the response, at the client, for example.

It is contemplated that the functionality described herein is equally applicable to other types of system with other types of end-user latency (e.g., page-load latency, virtual voice assistant latency, etc.).

In embodiments, a code build and deployment pipeline system (e.g., Build Pipeline Service 110) provides multiple various stages for build and deployment of code (e.g., automated or manual deployment, or some combination thereof). Some embodiments include a managed continuous delivery pipeline service that automates release pipelines for application and infrastructure updates. Some such build pipeline services automate build, test, and deploy stages (sometimes referred to as phases) of a release process every time there is a code change, based on the release model, for example. In some embodiments, an automated deployment pipeline system may function to automatically perform workflows (e.g., approval workflows or the like) for each of a number of stages of the pipeline, one workflow for building and compiling the updated code, another workflow for testing the updated code, another workflow for running the updated code in a partial-production execution environment and another workflow for deploying the updated application component with the code change to full production, all without manual intervention, yet preventing deployment of updated code that has errors or introduces latencies, such as latency experienced by end users.

Some such build pipeline services may be integrated with third-party services such as GitHub, custom plugins, or the like. Some such build pipeline services provide for modeling of the different stages of a software release process using a console interface, CLI, SDKs, etc. Some such features may facilitate specification of tests to run and customization of the steps to deploy an application and its dependencies, for example.

Example stages include, but are not limited to, a source stage, code build stage, code testing stages (e.g., alpha/beta) and various deployment stages, although other stages may be included in various embodiments. The code build and deployment pipeline system may deploy the code to any of various execution environments (e.g., test execution environment, non-production execution environment, partial-production execution environment, production execution environment, or the like) or combinations thereof, for example. Embodiments encompassing various different types and even combinations of systems, such as but not limited to various combinations of enterprise, on-premise, cloud-based systems or other types of system are contemplated.

Embodiments herein refer to a component of an application. In some embodiments an application may include a number of different components. In other embodiments the application may be the component that is updated. In some embodiments described herein, the techniques may be applied to a subcomponent of an application with multiple subcomponents.

Latency detection, as described herein, may be performed (e.g., as part of an approval workflow) at various of the stages of the pipeline 112 without departing from the scope of this disclosure. In some embodiments, the system may by configurable by a developer such that a developer may specify (e.g., via a latency assessor API) which stage(s) are to perform the latency detection and/or which execution environments are to be used to produce latency metric data to be compared in the latency detection analysis performed by the latency assessor.

In some embodiments, the code build and deployment pipeline system may perform, at any of various stages, latency detection for one or more updates to the code of an application, for example. Latency detection may determine that changes to code of a component of an application cause an undesirable amount of latency, such as, but not limited to latency experienced by an end-user of the application. A non-exhaustive list of latency causes includes changes deployed through a build pipeline, infrastructure changes, and external service changes. The latency introduced by the changes may be exhibited at the server-side system (or even by individual ones of sub-services that themselves may be updated and that contribute to an overall latency perceived by end-users interacting the system), at a target client device, and/or over one or more networks between the server, sub-systems, and/or the target client device. In some embodiments, individual latency values measured for each of the server, the client device and/or the network may be aggregated into an aggregate latency value. An aggregate latency value for the application without the update may be compared to an aggregate latency value for the application with the update to determine a latency regression associated with the update, in some embodiments. In some embodiments, latency associated with a particular update for a particular component of an application may be determined and analyzed with regard to that update's individual latency contribution to an overall latency experienced by an end-user of the greater service, prior to deployment to full production.

Detection of the latency may be determined variously. In one example embodiment, the system may analyze latency data for the version of the application including the updated component (C') relative to latency data for a version of the application without the update (e.g., an earlier version of the application, prior to the update (C)). The analysis may use any of various statistical methods for comparing the latency data for the version of the application including the update relative to the latency data for the version of the application without the update without departing from the scope of this disclosure. The latency data may be obtained by a latency metric recorder (e.g., 108) from the respective execution environments in which the versions of the application are run, in embodiments.

In embodiments, the code build and deployment pipeline system may perform analysis associated with the latency detection in response determining that there has been an update to a component of the application. For example, the system may automatically detect the change to the source code or to the executable, and/or may detect a request (e.g., via an API or otherwise) to deploy an updated version of a component of an application in one non-limiting example (e.g., to deploy the updated version to a particular execution environment such as to a production execution environment or the like).

In embodiments, end-user latency metrics for the application running in the production execution environment (e.g., for a version of the application prior to, or without, the update) may be obtained. For example, a latency metric recorder may obtain some such latency data for one or more end-user latency metrics for the application from the execution environment running the application.

The system may run the version of the application that includes the updated version of a component of the application at one of the stages providing a less-than-full-production execution environment (e.g., in order to obtain data that may be used for performing analysis associated with the latency detection). For example, the system may run the version of the application that includes the updated version of a component of the application at a code test stage that provides a test execution environment or in a partial-production deployment stage that runs the application with the update in a portion, but not all, of the production execution environment. In such an example, a remaining portion of the production execution environment may run the version of the application without the update, for example.

The system may analyze the latency data for the application without the update in comparison to the latency data for the application that includes the update. In some embodiments, the system analyzes latency data corresponding to the application including the update-relative to-one or more end-user latency metrics for the application (the version not including the update) running in the production execution environment to determine whether the update results in latency (in a particular example, to determine whether inclusion of the updated version of the component in the application results in a latency regression for the application).

In some embodiments, for the case where the system determines, based on the analysis of the latency data, that inclusion of the updated version of the component in the application results in a latency regression for the application, the system may halt the automated deployment for the updated version of the component. In some embodiments, for the case where the system determines, based on the analysis of the latency data, that inclusion of the updated version of the component in the application does not result in the latency regression for the application, the system may continue with the automated deployment for the updated version of the component.

Embodiments herein may be integrated with various types of an A/B testing stage (e.g., monitoring performance of different versions of a webpage, or roll out a new feature to a limited audience in a production environment) to identify latencies prior to moving the application to full productions, for example.

Attention will not be brought to the FIGS. Generally, FIGS. 1, 4, 6 and 7 illustrate various embodiments of architectures of system components, various of which may perform functionality illustrated in process FIGS. 2, 3A, 3B and 5. It is contemplated that some architectures may include more, fewer, or different components and that various different components may perform more, less or different functionality without departing from the scope of this disclosure.

FIG. 1 illustrates a system architecture in which latency detection is implemented within a deployment build pipeline, according to some embodiments. Illustrated are developer(s) 120A that interact with build pipeline service 110 to create and/or update code (e.g., for an application or sub-component of an application) and have the build pipeline service 110 automatically deploy the new or updates code to a production execution environment 104.

The illustrated build pipeline service 110 includes pipe-line(s) 112A (build pipeline service 110 may have any number of pipeline(s) 112A in operation at any given time) with source stage 113, code build stage 114, alpha and beta test stage 116 and gamma stage 117. In some embodiments, gamma stage 117 may be associated with deployment of the updated application to a non-production execution environ-ment that tries to mirror the production environment, with-out actually being a production environment. In embodi-ments, the partial-production stage 118 is a stage where a version of the application with the updated components is executed on some (generally, but not necessarily small) subset of the production execution environment while the non-updated version of the application continues to be executed on the remaining (e.g., larger) subset of the pro-duction environment. Pipeline(s) 112A is also illustrated with production deployment stage 119.

Generally, build pipeline service 110 automates deploy-ment of a code update by processing the updated code through the stages of the pipeline 112A. The latency assess-ment described herein may be applied at various of the stages, and a build service pipeline interface may accept configuration changes from developers or an admin. that may determine which stage(s) perform the latency assess-ment (e.g., as part of an approval workflow for that stage), who long the updated coded is tested, the latency metrics obtained during the execution of the code change, etc.

In FIG. 1, build pipeline service 110 is illustrated with latency assessor 111 and pipeline(s) 112A. Developers may integrate the pipeline with the latency assessor 111 via a latency assessor API, in embodiments. For example, devel-opers may specify configuration of the latency assessment (e.g., via a configuration API) how much time the updated code spends at each of the stages illustrated in FIG. 1 (e.g., 24 hours in gamma environment, 12 hours in partial-pro-duction, etc.). Developers may also specify, via the latency assessor API, the metrics to be tracked. The latency assessor API may be configured for specification of metrics to be tracked at various levels of granularity (e.g., latency by region or latency by device, etc.) in some embodiments.

Pipeline(s) 112A is illustrated with source stage 113, code build stage 114, various code test stages 115 (e.g., alpha and beta test stages 116, gamma stage 117, and partial produc-tion stage 118) and with production deployment stage 119. In embodiments, a stage is a logical unit that isolates an environment and limits the number of concurrent changes in that environment. Each stage may contain actions that are performed on the application artifacts (e.g., source code is an example of an artifact). A stage might be a build stage, where the source code is built and tests are run. It can also be a deployment stage, where code is deployed to runtime envi-ronments. Each stage is made up of a series of serial or parallel actions (expressed as a workflow, or otherwise) for example.

In embodiments, gamma stage 117 deploys the latest code to the smallest unit of deployment, such as to a single virtual machine or single container, or to a small percentage of compute service instances (e.g., a small percentage of instances of a serverless, event-driven compute service). Such a deployment may leave the rest of the gamma environment deployed with the current code (the current code without the update) for some period of time (such as but not limited to 30 minutes or one hour, etc.). In some embodiments, traffic doesn't have to be specially driven to the gamma environment. It can be added to the same load balancer or poll the same queue as the rest of the gamma environment, for example.

In some embodiments, an execution is a set of changes released by a pipeline. Each pipeline execution may be unique and has its own ID. An execution may generally correspond to a set of changes, such as a merged commit or a manual release of the latest commit in various embodi-ments. Two executions can release the same set of changes at different times, in a non-exhaustive example.

In some embodiments, build pipeline service 110 is a continuous delivery service that automates the building, testing, and deployment of applications into production. Continuous delivery is a software development methodol-ogy where the release process is automated. For example, every software change may be automatically built, tested, and deployed to production. In some embodiments, before the final push to production, a person, an automated test, or a business rule decides when the final push should occur. Although in some embodiments, every successful software change can be immediately released to production with continuous delivery, not all changes need to be released right away, in embodiments.

In the illustrated embodiment, the build pipeline service 110 receives some trigger to perform automated deployment of a code change and moves the code change through the stages (113-119) as approval is gained at each stage. Various of the stages may deploy the updated code to various execution environments (non-production execution environ-ment 106 and production execution environment 104 are illustrated as examples). The execution environments run the updated code (e.g., against simulated end user(s) 101A) that mimic the production environment (sometimes reusing requests obtained from the production service) or against actual production end users 102A and a latency metric recorder 108 obtains data for various latency metrics (e.g., from the execution environments, from end-user devices, or from various features of the network, from other applica-tions/(sub) services 140, etc.). In some embodiments, the latency metric recorder 108 obtains latency data for end-user latency metrics that are a measure of the end-user latency experience.

Various of the stages may call up the latency assessor 111 to analyze the latency metric data and determine whether the update to the code causes a latency regression. In embodi-ments, latency assessor 111 may store the latency assess-ment results to a results data store. If latency regression is determined for the update, the stage requesting the analysis may not approve further steps of the approval workflow, may prevent further deployment, and may send an alarm to a developer or admin concerning the latency regression. If there is not latency regression or the regression is minor, the approval workflow for the stage may continue towards the next stage.

Figure 2:
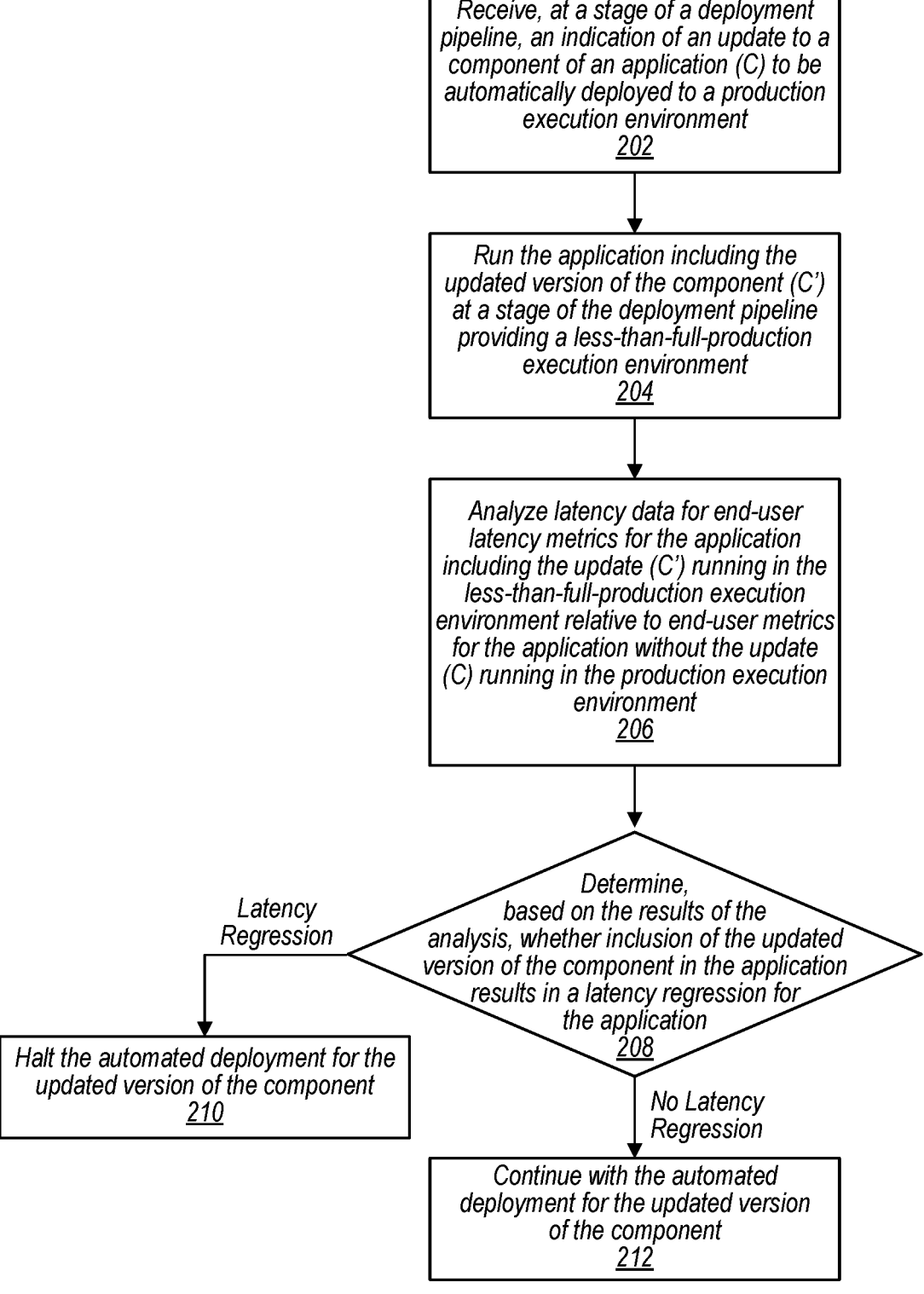
FIG. 2 illustrates a process diagram of latency detection functionality performed by one or more components of a deployment build pipeline, according to some embodiments.

FIG. 2 illustrates a process diagram of latency detection functionality performed by one or more components of a deployment build pipeline, according to some embodiments. The illustrated process may be performed by a build pipeline service 110, for example.

At block 202, the system receives, at a stage of a deploy-ment pipeline, an indication of an update to a component of an application (C) is to be automatically deployed to a production execution environment. For example, the system may automatically determine that code updates have been made or may receive an instruction from a developer to deploy the update. At block 204, the application including the updated version of the components (C') is run at a stage of the development pipeline providing a less-than-full-production execution environment. For example, a gamma stage of the pipeline system may run the updated component in a non-production execution environment 106, or a partial production stage 118 of the pipeline(s) 112A may run the updated components in a partial-production execution environment. In some embodiments, a latency metric recorder 108 may obtain and store latency date for the updated version of the component (C') running in the less-than-full-production execution environment (e.g., to a metrics data store or similar).

At block 206, the pipeline may analyze the latency data for the end-user latency metrics for the updated application component (C') running in the less-than-full-production execution environment relative to data for end-user metrics for the application without the update (C) running in the production execution environment. In various embodiments, the data for end-user metrics for the application without the update (C) running in the production execution environment may be for the application (the version without the updated component) currently running in the production execution environment or may be historical data of the application running in an environment. In some embodiments, instead of performing the analysis, the build pipeline may send a message to a compute service to request the analysis.

The system may analyze latency data for end-user metrics for the application including the update (C') running in the less-then-full-production execution environment relative to end-use latency metrics for the application without the update (C) currently running in the production execution environment. The analysis may include comparison of latency metrics for the version of the application with the updated component (C') running in any of the environments to latency metrics for the version of the application without the updated component (C) running in the same or some other environment, in embodiments. The analysis may be analysis of any metrics, such as but not limited to any metric monitored by a metrics service (e.g., a metrics service of a service provider, or a custom metric monitoring component of the pipeline system, etc.).

The analysis may include logic that removes possible causes of variation beyond latency caused by updates (e.g., the analysis may include analysis of metrics for a same period of time, in a same region, execution on the same type of machine, etc.). In some embodiments, the latency data that is analyzed may be cleaned up (e.g., statistically processed to remove outliers, etc.) prior to or as part of the analysis. In some embodiments, the analysis may include performing a numerical analysis of the latency metrics (e.g., calculating an average, means, median, mode, etc.) for C and C' and comparing the results to determine of any increase in latency is statistically significant. If latency regression is statistically significant the system may respond in any number of ways, such as generating and sending an alarm, halting deployment and/or rolling back a deployment or code change.

In embodiments, the analysis of latency data for the (second) version of the application that includes the component with the update with regard to latency data for the (first) version of the application (the version without the updated component) may be performed using latency data obtained in real-time or in near real-time with execution of the first and/or second versions of the application. In some embodiments, the analysis may use latency data that was obtained earlier or even historical latency data, or baseline values for the application. In some embodiments, various different types of latency data may be analyzed, such as a combination of current and historical latency data for the first and/or second versions of the application as well as latency data for just the updated component and/or latency date for the overall application, in aggregate.

At block 208, the pipeline 112A may determine, based on the results of the analysis, whether inclusion of the updated version of the component in the application results in a latency regression for the application. If a latency regression is determined (block 208, latency regression) the system may halt the automated deployment for the version of the application with the updated component (block 210). If there is no latency regression (block 208, no latency) the system may continue with the automated deployment for the updated version of the component of the application (block 212). In some embodiments, the determination may be a determination of whether the latency regression was sufficient to warrant halting the automated deployment. For example, determining whether the latency regression was greater than some threshold amount of acceptable latency regression or whether the latency has increased over known latency for a prior version of the application by some unacceptable level (e.g., 1% as a non-limiting example).

In embodiments, a decision to halt automated deployment may be overridden. For example, an alarm message may be sent to a developer or admin to notify the entity of the halt and to provide the entity with an option to override the halt. The override may be automated, in some embodiments. Data associated with the halt and/or the override may be logged to a latency assessment results data store 404, described below in FIG. 4 (e.g., the latency regression amount and an indication of the code change that causes the latency, a user account associated with the override) in embodiments. Such logs may be used for later analysis of causes of (e.g., accumulated) latency as illustrated in FIG. 5, describe below, for example. In some embodiments, the results of the analysis may be stored to a latency assessment results data store (e.g., 406, described below).

Figure 3B:
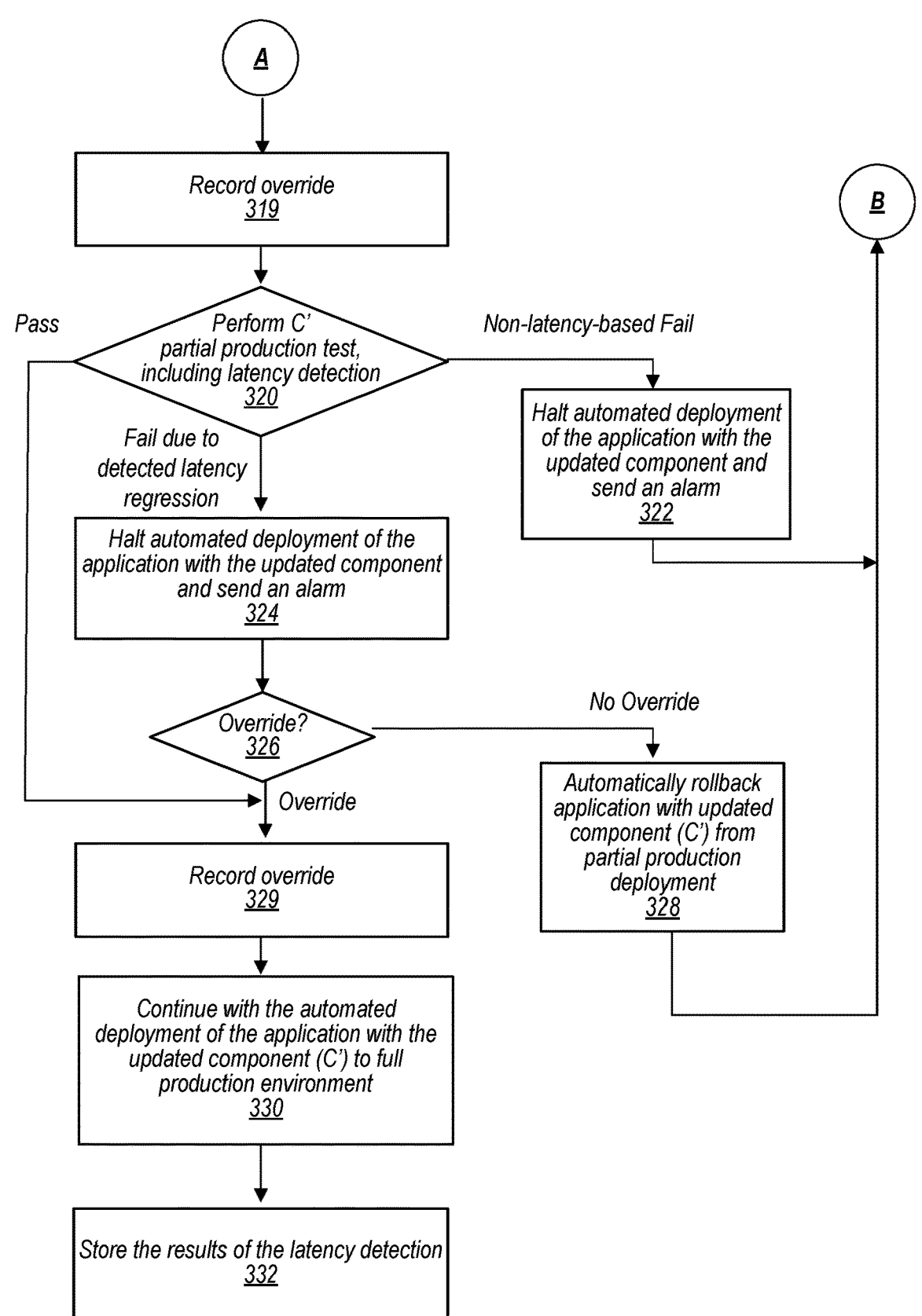

FIGS. 3A and 3B illustrate a process diagram of latency detection functionality performed by one or more components of a deployment build pipeline, according to some embodiments. One or more of the steps illustrated in FIGS. 3A and 3B may be performed by one or more components of build pipeline service 110, or by one or more compute services of a service provider network 610 (illustrated in FIG. 6, described below), as non-exhaustive examples. The illustrated functionality may be performed in a sequence different from that depicted, in some embodiments.

At block 302, the system may receive (e.g., in response to prompting for, or otherwise) custom configuration values for latency detection in the deployment pipeline. For example, the system may prompt for and receive (e.g., via an interface such as a GUI, CLI, API, etc.) selection of a particular environment from which the data for the latency metrics for the application and/or the particular environment from which the data for the latency metrics for the updated application are to be obtained. In another example, the system may prompt a developer to identify particular metrics (e.g., metrics that monitor various APIs between the system and various subcomponents (interservice calls), etc.) to be used in the latency analysis. In some embodiments, a developer may set configuration values in a configuration file that is read by the build pipeline service 110.

In some embodiments, for systems with a dedicated metrics service (e.g., a monitoring and observability service, such as that illustrated in FIG. 6, metric service 106, described below) the system may pre-populate user interface fields with metrics available from the dedicated metrics service, based on information from a configuration file, in embodiments. For example, the dedicated metrics service may, as a regular part of the service (e.g., as a default or base level of service of the metrics service), monitor system components (e.g., end-user devices/application components, server-side components, network components, etc.) for various metrics and log or store those metrics to a metrics data store (e.g., FIG. 4, 404A, described below).

The system may provide an interface (API, CLI, command line, etc.) for a developer to specify that latency detection is to be enabled as part of the automated build pipeline process and/or specify a particular set of latency metrics to be monitored and/or a time period over which the latencies are to be measured.

In some embodiments, the system may provide predefined or default values for some such configuration values. Metrics may be selected that are particular to the application being monitored. For example, systems with a voice-based interface may use different end-user latency metrics than systems with a display-based or API-based interface. Developers of particular applications may request that a metrics service obtain new and different types of latency metrics, to be used in the analysis, in embodiments, such as latency metrics specialized for a particular type of device suited to a particular application or service.

The custom configuration values for latency detection in the deployment pipeline may be selected from the various metrics tracked by the dedicated metrics service (e.g., FirstResponselatency (FRL) or User Perceived Latency-UPL (UPL), etc.) in embodiments. User-perceived latency (sometimes referred to as end-user latency, herein) may be a measure of time, from a time an end-user starts expecting a response (e.g., when an end-user makes a request, or finishes making a request) until a time when the response is provided to the end-user by the system (e.g., when the end-user of the end-user device perceives the result (e.g., when the end-user device displays, announces, or otherwise provides the requested result). In some embodiments, custom metrics, particular to the system/service for which the metrics are monitored may be created (e.g., by an admin or developer) and submitted to the metrics service for the metrics service to monitor/obtain on behalf of the pipeline.

At block 304, an update to a component C of an application is determined (e.g., at a source stage 113 of build pipeline service 110). In some embodiments, the pipeline 112 may automatically detect the code update or a developer may interact with a user interface for the build pipeline to inform the pipeline of the update, for example. At block 306 the service receives a request to automatically deploy the updated version of the component (C') of the application in a production environment. In embodiments, the request may be via an interface of the pipeline, or may be generated by a component of the pipeline service in response to determining the update to the component. In some embodiments, the pipeline may be configured to automatically perform the process without an explicit request (the deployment process may be carried out automatically, based on the system detecting the code change).

Blocks 308-328 of FIGS. 3A and 3B illustrate process steps that correspond to various stages (e.g., stages 113-119) of a build pipeline(s) 112A, in embodiments. As described herein, the pipeline(s) 112A may be configurable to perform the latency assessment at any of one or more of the stages (or even at stages of a deployment pipeline different from those illustrated herein). In the illustrated embodiment, the pipeline 112A is configured to perform the latency detection as part of the gamma stage 117 (e.g., as part of an approval workflow), and as part of the partial production stage 118. The pipeline is configured such that latency detection is not performed for the source stage 113, code build stage 114, at least in the illustrated embodiment.

In some embodiments illustrated in FIGS. 3A and 3B, if an execution fails, it stops and does not completely traverse the pipeline. Its status is a FAILED status and the stage is unlocked. A more recent execution may catch up and enter the unlocked stage and lock it, in some embodiments. In embodiments, a failed execution may be retried unless the failed execution has been superseded or is not retriable.

At block 308, build stage process step(s) are performed for C' (the version of the application with the updated component). If a step of the build process fails (block 308, fail) the flow continues to block 314 where the system may halt the automated deployment of the application with the updated component and send an alarm. If the application with the updated components passes all the steps of the build process stage (block 308, pass) the sequence moves onto the next stage, performing C' alpha and beta test process steps 310. If a step of the alpha or beta test process fails (block 310, fail) the flow continues to block 314 where the system may halt the automated deployment of the version of the application with the updated component and send an alarm. If the version of the application with the updated component passes all the steps of the alpha and beta test process stage (block 310, pass) the sequence moves onto the next stage, performing C' gamma test process steps, including a latency detection step (block 312). If a non-latency-related step of the gamma test process fails (block 312, non-latency-based fail) the flow continues to block 314 where the system may halt the automated deployment of the application with the updated component and send an alarm. If the C' gamma test process steps fail due to detected latency regression, the process continues to block 316 halting automated deployment of the updated application component and sending an alarm. The halt of the automated deployment may be overridden (block 318) and the override recorded (block 319) to a data store (e.g., to latency assessment results data store 406, where it may be used by the process illustrated in FIG. 5, describe below) which causes the process to move on to block 320 performing C' partial-production test steps, including a latency detection step (block 320). If the updated component passes all the steps (including latency detection) of the beta test process stage (block 312, pass) the sequence moves onto the next stage, performing C' partial-production test steps, including a latency detection step (block 320).

If a step of the partial-production test process (including latency detection, in the illustrated embodiment) fails (block 320, non-latency-based fail) the flow continues to block 322 where the system may halt the automated deployment of the updated application component and send an alarm. If the updated component passes all the steps (including latency detection) of the gamma test process stage (block 320, pass) the sequence moves onto the next stage, continuing with the automated deployment of the updated application component (C') to the full production environment (block 330). If performance of C' partial-production testing fails due to detected latency regression, the system may halt automated deployment of the version of the application with the updated component (C') and send an alarm (block 326), which may be overridden (326), in which case the process continues to block 329 (record the override event to a data store) and then to block 330 where the process continues with the automated deployment of the updated application component (C') to the full production environment. In the illustrated embodiment, if the halt of the automated deployment is not overridden, the system may be configured to automatically rollback the application with the updated component (C') from the partial-production execution environment (block 328). Results of the latency detection may be stored (block 334), to latency assessment results data store 406 in either case, such as when the automated deployment is a success (block 332) or when the automated deployment fails in some embodiments. A non-exhaustive list of example data to be stored includes: a unique ID for each update, and analysis data including pass/failure assessment, reasons for the failure/success, end-user latency values associated with updates, overrides, rollbacks, identity of the particular environment, identification of the particular change, etc. for each of the stages of the pipeline.

With regard to overrides, upon a failure, the system may send a message to a developer or to an admin or the like, indicating that the automated deployment of C' has been halted and/or providing the option to override the halt. In some instances, the developer or admin may note the reasons for the halt (e.g., latency regression, or some other failure of an approval workflow) and select the override option because the latency regression is relatively small or for some other reason, for example. If override is selected the process proceeds, overriding the halt and continuing with the automated deployment of the application with the updated component (C'). The reasons provided for the override, as well the override itself and the component update with which the override is associated by be recorded to a data store. In some embodiments, an override of a failure in one of the earlier stages may cause the process to move onto the next stage in sequence.

In embodiments, deployment of the updated application component (C') to the full production environment (block 330) means that few to none of the application component C (the version without the update) are run in the full production environment with C'.

In embodiments, when there is a failure resulting in halting the automated deployment (e.g., blocks 314, 316, 322, 324) and/or the halt is not overridden, the process may return (after recording the halt, the reason for the halt and the code update associated with the halt) back to block 304, waiting to determine an update produced by a developer in response to the alarm, in one non-limiting example.

The latency analysis performed at any of the stages may include logic that determines whether a latency regression is sufficient to trigger remedial action, such as sending an alarm to a development team or rolling back a change. The logic may use any combination of rules or statistical analysis to make the determination. For instance, not all latency regression may cause a halt. For example, whether or not to halt the automated deployment may depend upon the extent of the latency regression (e.g., as a percentage of prior exhibited latency, compared to some baseline threshold amount of latency, etc.). Rules for determining whether the end-user latency is large enough to warrant halting the automated deployment process may be based on a combination rule. In a non-limiting example, a combination rule may consider both of whether latency associated with a current update is less than some threshold increase over the last version, and also whether an accumulated latency (a more gradual latency regression where individual regressions are insufficient to trigger remediation) over a number of updates including the latest update is less than some other threshold. The thresholds may be configurable, may be based upon some baseline and may allow for some small increase in latency without triggering remedial action, in embodiments.

Figure 4:
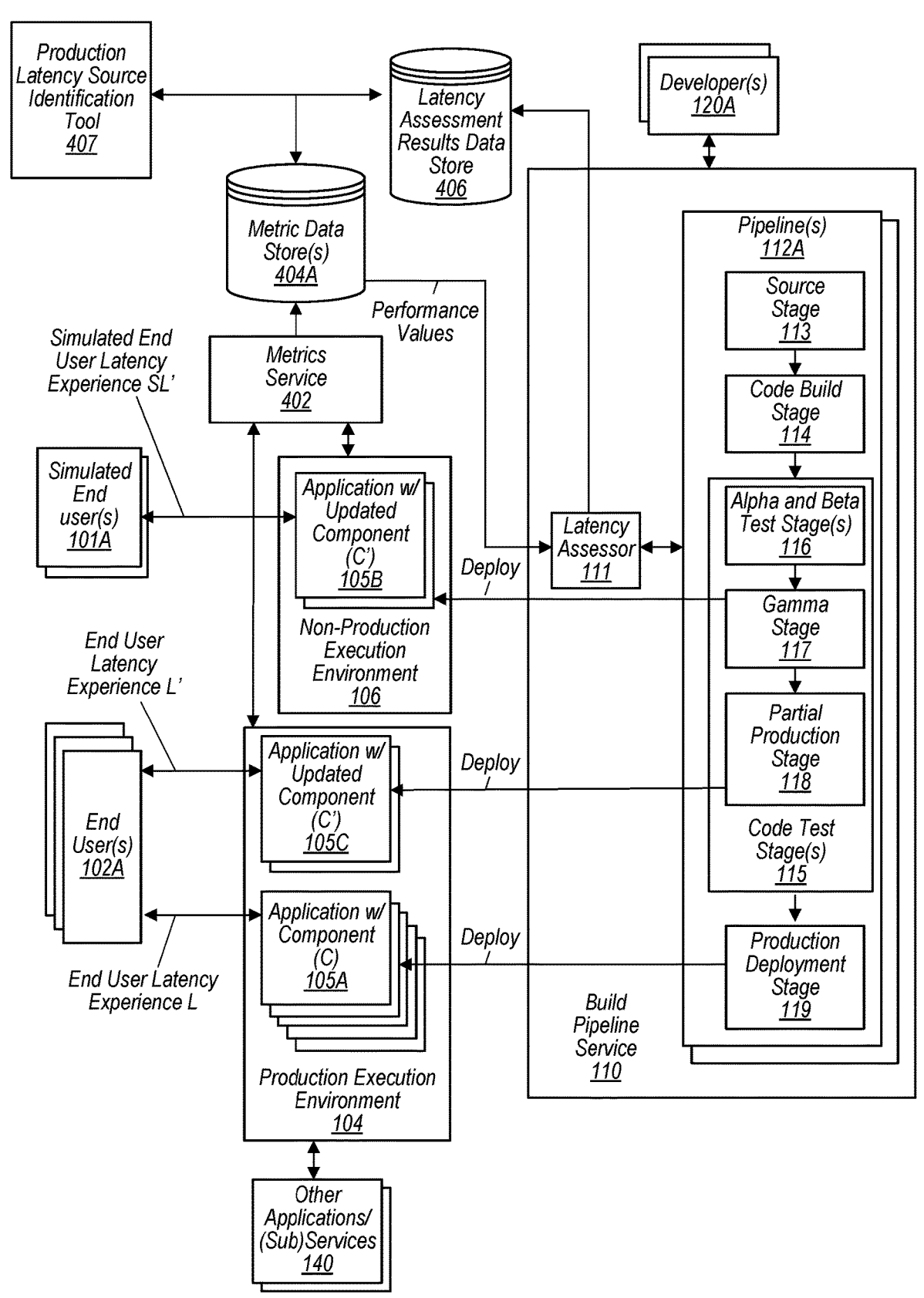
FIG. 4 illustrates a system architecture in which latency detection is implemented within a deployment build pipeline, according to some embodiments.

FIG. 4 illustrates a system architecture in which latency detection is implemented within a deployment build pipeline, according to some embodiments. FIG. 4 illustrates that a metrics service 402 (e.g., a monitoring service of a service provider) monitors the execution environments 106, 104 and obtains latency data from execution of the application with the non-updated component (C) and execution of the application with the updated component (C'). The metrics service 402 stores the latency data to a metrics data store 404A and latency assessor 111 may analyze the latency data, in at least the illustrated embodiment.

In embodiments, metrics service 402 may monitor performance of other application/sub-services 140 that the application with the updated component (C') relies on for certain functionality and the latency assessor 111 may aggregate the latency from the individual sub-components into an aggregate latency for analysis (e.g., for comparison with an aggregate latency for the application without the update to the component). Configuration of the system may include instructing the system to monitor for a list of some such pre-defined metrics, which are later analyzed by latency assessor 111, in embodiments. The system may monitor a set of default metrics, in some embodiments. In embodiments, latency assessor 111 may access metrics from data store 404A and store the latency assessment results to results data store 406.

FIG. 4 also illustrates that latency assessor 111 stores latency assessment results to results data store 406 and a production latency source identification tool 407 that may use some combination of the latency metrics and/or the latency assessment results (e.g., to perform identification of a particular change to a component that contributed to latency regression in the production environment, illustrated in FIG. 5, described below).

In some embodiments, metrics service 402 may obtain latency data for applications (C and/or C') deployed to the production environment 104. A process (not illustrated) may process the latency data for the application executing in the production environment (e.g., monitoring the latency data or analyzing the latency data) and may send an alarm regarding latency of the application executing in the production environment (e.g., send a message to a developer or admin or similar indicating that latency for the application has surpassed some threshold or has increased by some percentage, etc.). In some embodiments, the developer or the admin or similar may interact with the production latency source identification tool 407 to identify a source of the latency that triggered the alarm (e.g., the developer may act in response to the above-noted alarm).

In some embodiments, the system may establish a baseline end-user latency value for an application or for components of an application executing in the production environment. Other production-based latency detection techniques may include application of a latency analysis rule (e.g., specifying that production latency regression cannot be greater than some value or percentage of the baseline, or the like without triggering an alarm or further analysis, for example).

In some such systems, the logged results may be manually reviewed to match particular updates to particular incremental increases in latency. Developers may use such matches to manually target new changes or to manually rollback changes, for example. However, at least due to the nature of some pipelines, review of logged latency metrics that is limited to metrics only from full-production may be challenging to match to a single update (e.g., a deployment pipeline may deploy new versions of an application that include a number of updates-making matching a particular update to a particular latency regression difficult). In contrast, systems like those illustrated in FIGS. 1, 4, 6 and 7 that perform latency detection at various different stages of the pipeline (perhaps for each individual update, in some embodiments) may generate records with a finer granularity and that facilitate production of more closely-aligned matches between a latency regression and a particular change and are therefore able to point developers more directly to the update causing the latency regression.

In some systems, the nature of latency analysis is limited to some subset of a service that provides a picture of latency at a granularity that something less than the latency experienced by an end user of the system/service. Some embodiments herein instead function to measure latency experienced by an end-user (e.g., a more wholistic, aggregated measure of latency exhibited by the overall system) and include functionality that detects that latency regression prior to deployment to full production (e.g., during automated processing performed by an automated, continuous deployment pipeline). The system may function to determine the contribution of a code change to device-side latency, the contribution of a code change to network-based latency and/or the contribution of a code change on server-side latency, individually and in aggregate, in embodiments.

FIG. 5 illustrates a process diagram of production latency detection functionality performed by a production latency source identification tool 407, according to some embodiments.

As noted above, a production latency source identification tool 407 may be used to identify code updates as potential contributors to a latency regression. Production latency source identification may be performed on-demand, in some embodiments. In some embodiments, a production latency source identification may be performed to identify a one or more particular code changes (and/or overrides) as sources of a latency regression (e.g., for a regression that has developed over a number of accumulated code changes, wherein different individual ones of the code updates may contribute in a relatively minor way to latency, but when considered together in aggregate with other updates over time, accumulate to an unacceptable latency regression).

In embodiments, various sources of data may be used by the production latency source identification tool 407 to perform a production latency source identification for example, but not limited to latency data stored in the metric data store 404A and/or latency assessment results data stored in a results data store 406 by latency assessor 111 as part of performance of latency assessment within the pipeline(s) 112A. For example, latency assessor 111 may log or otherwise record assessment results from the analysis described in FIGS. 2, 3A, 3B (e.g., a unique ID for each update, and analysis data including pass/failure assessment, end-user latency values associated with updates, overrides, rollbacks, identify of the particular environment, etc. for each of the stages of the pipeline).

In the illustrated embodiment, the production latency source identification tool 407 receives a request to production latency source identification across all (or some specified number of) prior version of a component of an application (block 502). The request may be a manual request, by an administrator, for example.

At block 504, the production latency source identification tool 407 may access historical latency assessment results for the requested number of component updates made via the deployment pipeline. In some embodiments, the updates for consideration during the assessment may be limited (e.g., limited to the updates since a baseline was established, or limited to a time period coinciding with the observed latency regression, or otherwise). In some embodiments, the production latency source identification tool 407 may access other data, such as the latency data in the metric data store 404A, for example.

At block 504, the production latency source identification tool 407 may identify, based on the analysis in 504, one or more of the component updates as potential contributors to observed latency regression. Such identification may be helpful to developers charged with reducing end-user latency of a production service. For example, because, in some embodiments, the data in the metrics data store 404A as well as in latency assessment results data store 406 may be associated (e.g., via unique IDs for each component update) with individual code updates, such an analysis may identify particular component updates (or even particular overrides) as potential contributors to an end-user latency that accumulated over numerous updates.

At block 506, the production latency source identification tool 407 may respond to the request with a list of potential contributing component updates that exhibited contribution to an accumulated latency regression. Such information may be used variously, such as to identify the affect of overrides on end-user latency. Also, a developer may use such results to identify particular component updates for further code changes. The list may be presented as a production environment end-user latency assessment report that identifies a group of updates as the main contributors to the accumulated latency regression exhibited by the application with all the component updated running in the production environment.

In embodiments, the production latency assessment illustrated in FIG. 5 may be performed sometime after one or more component updates have successfully been deployed into a full production execution environment.

Figure 6:
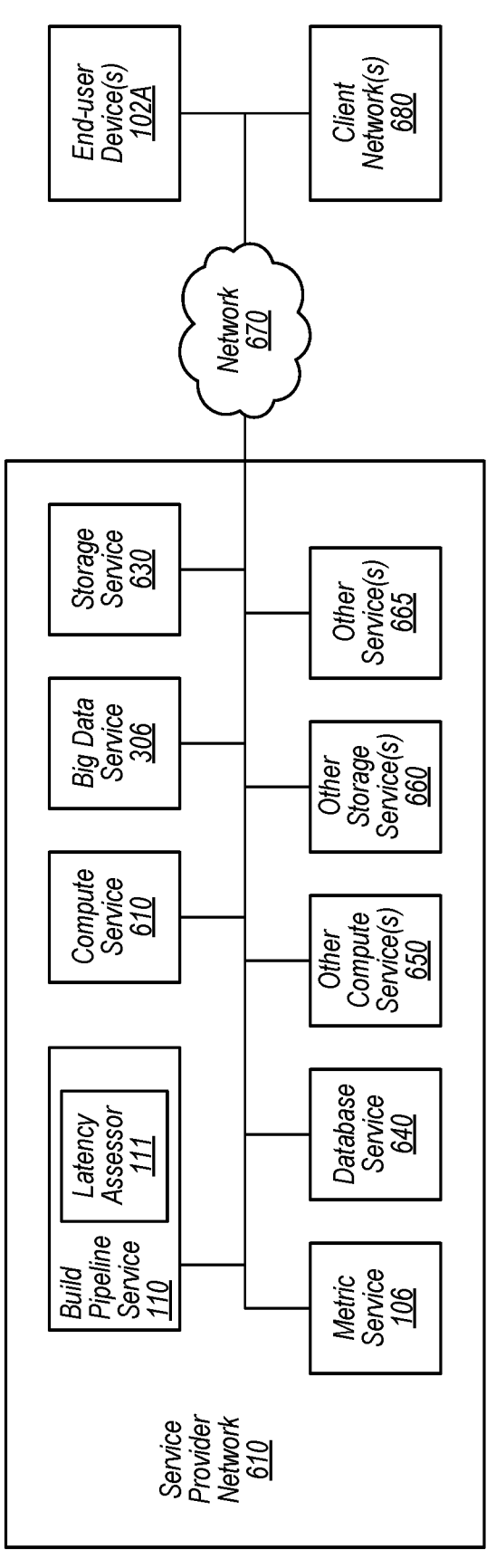
FIG. 6 illustrates a service provider network with various services that implement one or more portions of latency detection functionality performed by one or more components of a deployment build pipeline, according to embodiments.

FIG. 6 illustrates a service provider network with various services that implement one or more portions of latency detection functionality performed by one or more components of a deployment build pipeline, according to embodiments. In the illustrated embodiment, software developers (e.g., using devices on a client network 680, or virtual compute instances of compute service 610, for example) may make changes to components of an application executing in various hosted environments (e.g., compute service 610, other compute service(s) 650. The application may use various of the storage services 630, 540, 660, etc., in embodiments. The changes may be made via a build and deployment pipeline service 110 of the service provider, and a latency assessor 111 may perform latency analysis, detection and/or assessment, as described herein, in embodiments. In at least the illustrated embodiment, end-user latency may be measured for users outside of the service provider network 610, such as for end-user devices 102A, and/or for uses accessing the application from within the service provider network 610 (via virtual compute instances of compute service 610, for example).

In at least the illustrated embodiment, metric service 106 may record the metrics (e.g., to a data storage service 630 or to a database service 640). In some embodiments, big data service 306 may be called upon to perform some part of the latency analysis (e.g., analyzing the latency metrics from data store 404A and providing the results to latency assessor 111).

Example Computer System

Figure 7:
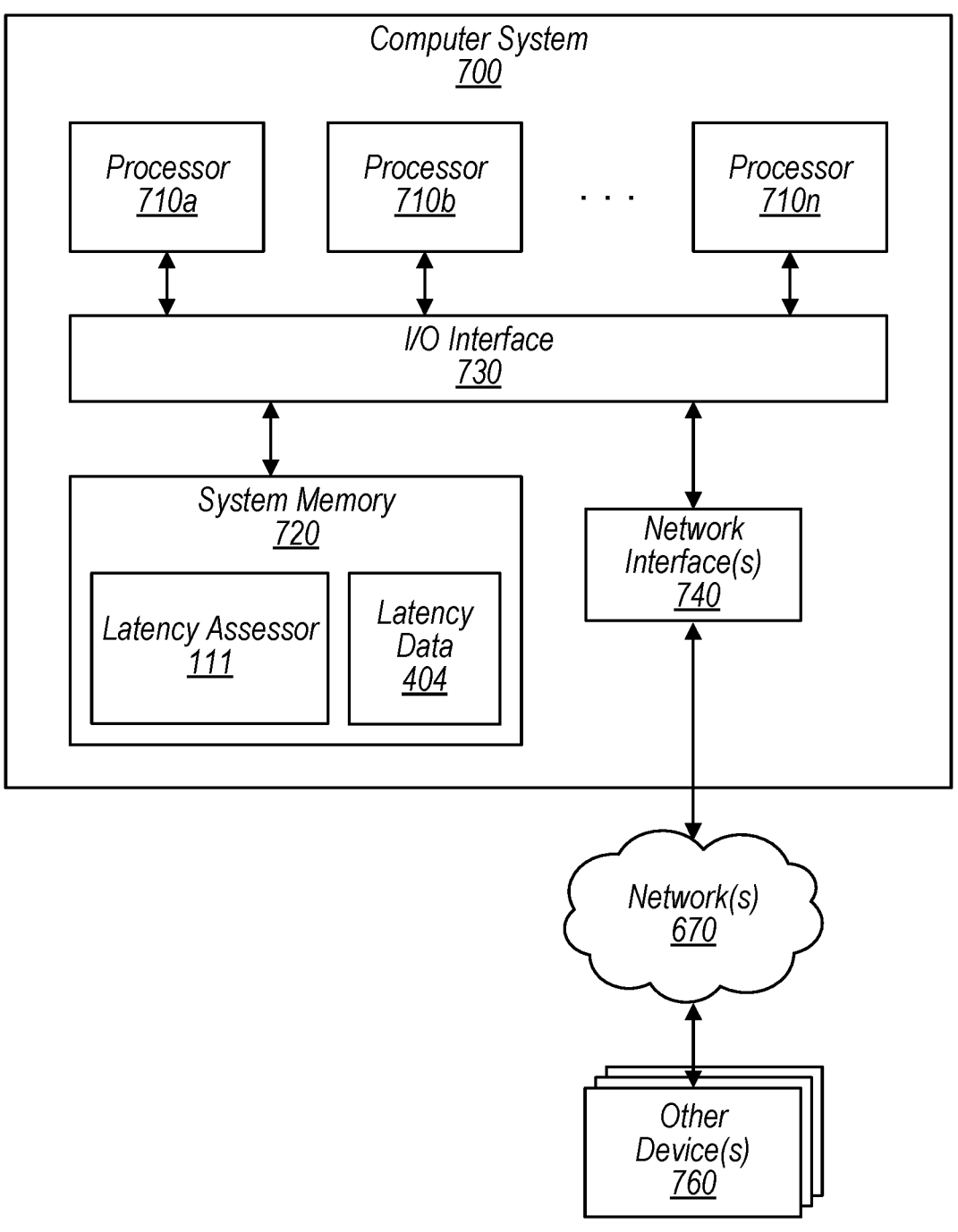
FIG. 7 illustrates an example of a computer system, one or more of which may implement various components described and illustrated throughout the disclosure, including latency detection functionality performed by one or more components of a deployment build pipeline, according to embodiments.

FIG. 7 illustrates an example of a computer system, one or more of which may implement various components described and illustrated throughout the disclosure, including latency detection functionality performed by one or more components of a deployment build pipeline, according to embodiments.

Various portions of systems in FIGS. 1, 4, 6, 7 and/or methods presented in FIGS. 2, 3A, 3B and 5 described herein, may be executed on one or more computer systems similar to that described herein, which may interact with various other devices of the system.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 760, such as cursor control device, keyboard, audio device, and display(s). In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for latency analysis and detection may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for latency detection functionality performed by one or more components of a deployment build pipeline, are shown stored within system memory 720 as latency assessor 111 and data stores 404A/406, respectively. In other embodiments, program instructions and/or data may be received, sent, or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740. Program instructions may include instructions for implementing the techniques described with respect to any of the FIGS.

In some embodiments, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing, or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network 670, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Computing device 700 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Memory 720 may include program instructions (e.g., such as latency assessor code 111), configured to implement embodiments of latency detection functionality performed by one or more components of a deployment build pipeline, as described herein, and data storage 304/306, comprising various data accessible by the program instructions 110. In one embodiment, program instructions 111 may include software elements of a method illustrated in the above figures. Data storage 304/306 may include data that may be used in embodiments described herein. In other embodiments, other or different software elements and/or data may be included.

Those skilled in the art will appreciate that computer system 700 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations. In some embodiments, portions of the techniques described herein (e.g., certificate signing request management) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more processors and memory storing program instructions executable on or across the one or more processors to implement an automatic code deployment pipeline system configured to:

provide a plurality of stages for automated deployment of code to a production execution environment, wherein the plurality of stages comprises a code build stage and one or more code testing stages;

responsive to a request to deploy an updated version of a component of an application in the production execution environment:

run the application including the updated version of the component at one of the plurality of stages providing a portion of a production execution environment that is a less-than-full-production execution environment;

obtain latency data for one or more end-user latency metrics for the application including the updated version of the component running in the less-than-full-production execution environment, wherein the one or more end-user latency metrics approximate latency perceivable by an end-user and are based at least in part on a time when a response to the request is ready to send without accounting for transmission time to a device where the latency would be perceived by the end-user;

analyze the latency data corresponding to the application including the update relative to one or more end-user latency metrics for the application running in the production execution environment to determine whether inclusion of the updated version of the component in the application results in a latency regression for the application;

responsive to determining, based on the analysis of the latency data, that inclusion of the updated version of the component in the application results in a latency regression for the application, halting the automated deployment for the updated version of the component; and responsive to determining, based on the analysis of the latency data, that inclusion of the updated version of the component in the application does not result in the latency regression for the application, continuing the automated deployment for the updated version of the component.

2. The system of claim 1, wherein the latency data obtained for the application that includes the updated version of the component is latency data obtained for the application that includes the updated version running in a partial-production execution environment.

3. The system of claim 1, wherein:

the automatic code deployment pipeline system is implemented on or across one or more services of a service provider network that provides compute and storage services to a plurality of clients on respective client networks;

the analysis of the latency data is performed by a stateless, event-driven compute service of the service provider network; and the latency data is generated via a metrics service of the service provider network.

4. The system of claim 1, wherein the automatic code deployment pipeline system is further configured to:

responsive to said determining that inclusion of the updated version of the component in the application results in a latency regression for the application:

send a message indicating that the automated deployment for the updated version of the component has been halted due to the latency regression;

receive a message indicating override of the halt of the automated deployment for the updated version of the component; and responsive to receipt of said override, continue the automated deployment for the updated version of the component.

5. A method, comprising:

performing, by one or more computing devices configured to implement an automatic code deployment pipeline system:

responsive to determining an update to a component of an application to be automatically deployed, via the automatic code deployment pipeline system, to a production execution environment:

running the application including the updated version of the component at a stage of an automatic code deployment pipeline system providing a portion of a production execution environment that is a less-than-full-production execution environment;

analyzing:

latency data for one or more latency metrics for the version of the application that includes the updated component running in the portion of a production execution environment that is a less-than-full-production execution environment relative to latency data for the one or more latency metrics for the application running in an execution environment, wherein the one or more latency metrics comprise one or more end-user latency metrics that approximate latency perceivable by an end-user and are based at least in part on a time when a response to the request is ready to send without accounting for transmission time to a device where the latency would be perceived by the end-user;

determining, based on the analyzing, whether inclusion of the updated component in the application results in a latency regression for the application; and halting, responsive to determining, based on the analysis of the latency data, that inclusion of the updated component in the application results in a latency regression for the application, the automated deployment for the updated application; or continuing, responsive to determining, based on the analysis of the latency data, that inclusion of the updated component in the application does not result in the latency regression for the application, the automated deployment for the updated application.

6. The method of claim 5, wherein said determining is performed as a step of an automated workflow for a stage of an automatic code deployment pipeline system and is performed based on analysis of latency data obtained for a less-than-full-production execution environment.

7. The method of claim 5, wherein said analyzing comprises analyzing latency data for one or more latency metrics for the version of the application that includes the updated component running in a partial-production execution environment relative to one or more baseline latency metrics for the application, wherein the one or more baseline latency metrics are one or more latency metrics determined for a prior version of the application.

8. The method of claim 5, wherein said one or more latency metrics for the application running in an execution environment comprises one or more baseline latency metrics for the application running in a production execution environment; and wherein said determining whether inclusion of the updated component in the application results in a latency regression comprises determining whether the latency data for one or more latency metrics for the version of the application with the updated component exceed the one or more baseline latency metrics by a threshold value.

9. The method of claim 5, wherein said determining whether inclusion of the updated component in the application results in a latency regression comprises determining:

whether the latency data for one or more latency metrics for the version of the application that includes the updated component exceed the one or more latency metrics for the application by a threshold value; and whether a cumulative latency value indicating an accumulated latency across a plurality of different updates to the application exceeds a threshold value.

10. The method of claim 5, further comprising:

responsive to said determining that inclusion of the updated component in the application results in a latency regression for the application, sending an alarm message indicating the latency regression to a developer user account, wherein the alarm message indicates a particular component update associated with the latency regression.

11. The method of claim 5, wherein:

said analyzing comprises analyzing latency data for one or more latency metrics for the application that includes the updated component running in a partial-production execution environment relative to one or more latency metrics for the application running in a production execution environment; and the method further comprises:

responsive to said determining that inclusion of the updated component in the application results in a latency regression for the application, initiating automated rollback of the version of the application that includes the updated component from the partial-production execution environment.

12. The method of claim 5, wherein said analyzing comprises:

analyzing:

latency data for one or more latency metrics for the version of the application that includes the updated component running in a less-than-full-production execution environment relative to one or more latency metrics for the application running in the less-than-full-production execution environment.

13. One or more non-transitory computer-readable media storing program instructions executable on or across one or more processors to implement an automatic code deployment pipeline configured to:

responsive to determination of an update to a component of an application to be automatically deployed to a production execution environment:

run the application including the updated version of the component at a stage of an automatic code deployment pipeline system providing a portion of a production execution environment that is a less-than-full-production execution environment;

determine, based on analysis of latency data for one or more latency metrics for the version of the application that includes the updated component running in the portion of a production execution environment that is a less-than-full-production execution environment relative to latency data for the one or more latency metrics for the application running in an execution environment, whether inclusion of the updated component in the application results in a latency regression for the application, wherein the one or more latency metrics comprise one or more end-user latency metrics that approximate latency perceivable by an end-user and are based at least in part on a time when a response to the request is ready to send without accounting for transmission time to a device where the latency would be perceived by the end-user; and halt, responsive to determining, based on the analysis of the latency data, that inclusion of the updated component in the application results in a latency regression for the application, the automated deployment for the updated application; or continue, responsive to determining, based on the analysis of the latency data, that inclusion of the updated component in the application does not result in the latency regression for the application, the automated deployment for the updated application.

14. The one or more non-transitory computer-readable media of claim 13, storing program instruction executable on or across the one or more processors to:

receive custom configuration values for the analysis, wherein the custom configuration values specify:

an execution environment for running the updated application;

the one or more latency metrics to be used in the analysis; or a time period for which the one or more latency metrics are to be analyzed.

15. The one or more non-transitory computer-readable media of claim 13, storing program instruction executable on or across the one or more processors to:

receive an indication of enablement of latency assessment as part of the automatic code deployment pipeline.

16. The one or more non-transitory computer-readable media of claim 13, storing program instruction executable on or across the one or more processors to perform said analysis, comprising analyze latency data for one or more latency metrics for the version of the application that includes the updated component running in a partial-production execution environment relative to one or more baseline latency metrics for the application, wherein the one or more baseline latency metrics are one or more latency metrics determined for a prior version of the application.

17. The one or more non-transitory computer-readable media of claim 13, wherein to perform said determine, the one or more media store program instruction executable on or across the one or more processors to determine:

whether the latency data for one or more latency metrics for the version of the application that includes the updated component exceed the one or more latency metrics for the application by a threshold value; and whether a cumulative latency value indicating an accumulated latency across a plurality of different updates to the application exceeds a threshold value.

18. The one or more non-transitory computer-readable media of claim 13, storing program instruction executable on or across the one or more processors to perform:

said analysis, comprising analysis of latency data for one or more latency metrics for the version of the application that includes the updated component running in a partial-production execution environment relative to one or more latency metrics for the application running in a production execution environment; and responsive to said determine that inclusion of the updated component in the application results in a latency regression for the application, initiate an automated rollback of the version of the application that includes the updated component from the partial-production execution environment.

19. The one or more non-transitory computer-readable media of claim 13, storing program instruction executable on or across the one or more processors to perform:

responsive to said determining that inclusion of the component update in the application results in a latency regression for the application:

send a message indicating that the automated deployment for the version of the application that includes the updated component has been halted due to the latency regression;

receive a message indicating override of the halt of the automated deployment; and responsive to receipt of said override, continue the automated deployment for the version of the application that includes the updated component.

20. The one or more non-transitory computer-readable media of claim 13, storing program instruction executable on or across the one or more processors to perform:

responsive to said determining that inclusion of the updated component in the application results in a latency regression for the application, send an alarm message indicating the latency regression to a developer user account, wherein the alarm message indicates a particular component update associated with the latency regression.

* * * * *